US008930109B2

(12) United States Patent
Utke et al.

(10) Patent No.: US 8,930,109 B2
(45) Date of Patent: Jan. 6, 2015

(54) VEHICLE HAVING SPEED CONTROL UNIT

(71) Applicant: Polaris Industries Inc., Medina, MN (US)

(72) Inventors: Jeremy J. Utke, Osceola, WI (US); David W. Jubie, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 14/014,057

(22) Filed: Aug. 29, 2013

(65) Prior Publication Data

US 2014/0000972 A1 Jan. 2, 2014

Related U.S. Application Data

(62) Division of application No. 12/501,944, filed on Jul. 13, 2009, now Pat. No. 8,543,306.

(60) Provisional application No. 61/135,864, filed on Jul. 24, 2008.

(51) Int. Cl.
| *F02D 13/00* | (2006.01) |
| *F02D 9/02* | (2006.01) |
| *B60N 2/02* | (2006.01) |
| *B60N 2/50* | (2006.01) |
| *B60N 2/52* | (2006.01) |
| *B60N 2/54* | (2006.01) |
| *F02D 9/14* | (2006.01) |
| *F02M 35/10* | (2006.01) |
| *F02M 35/16* | (2006.01) |
| *B60N 2/10* | (2006.01) |
| *B60K 13/02* | (2006.01) |
| *F02D 31/00* | (2006.01) |

(52) U.S. Cl.
CPC ............... *F02D 9/02* (2013.01); *B60N 2/0284* (2013.01); *B60N 2/502* (2013.01); *B60N 2/505* (2013.01); *B60N 2/522* (2013.01); *B60N 2/544* (2013.01); *F02D 9/14* (2013.01); *F02M 35/10032* (2013.01); *F02M 35/162* (2013.01); *B60N 2/10* (2013.01); *B60K 13/02* (2013.01); *F02D 2009/023* (2013.01); *F02D 31/006* (2013.01); *F02D 2200/501* (2013.01)
USPC ......................................... 701/70; 123/90.12

(58) Field of Classification Search
USPC .............. 701/70, 100, 116; 123/90.12, 90.13, 123/90.22–90.26, 90.32
See application file for complete search history.

(56) References Cited

U.S. PATENT DOCUMENTS

| 2,729,298 A | 1/1956 | Le Tourneau |
| 3,088,538 A | 5/1963 | Brennan et al. |

(Continued)

FOREIGN PATENT DOCUMENTS

| DE | 19531985 A1 | 3/1997 |
| EP | 1296036 A2 | 3/2003 |

(Continued)

OTHER PUBLICATIONS

European Patent Office, International Search Report for PCT/US2009/049799, mailed on Feb. 24, 2010; 6 pages.

(Continued)

*Primary Examiner* — Dalena Tran
(74) *Attorney, Agent, or Firm* — Faegre Baker Daniels LLP

(57) ABSTRACT

A tractor is disclosed as a four-wheel drive vehicle with a movable seat back, with a seat height adjustment and with a varying load capability.

20 Claims, 21 Drawing Sheets

(56) References Cited

U.S. PATENT DOCUMENTS

| | | |
|---|---|---|
| 3,167,298 A | 1/1965 | Senkowski |
| 3,171,394 A | 3/1965 | Beegle |
| 3,347,512 A | 10/1967 | Campbell |
| 3,841,696 A | 10/1974 | Wagner |
| 4,009,695 A | 3/1977 | Ule |
| 4,176,633 A | 12/1979 | McCabe |
| 4,674,265 A * | 6/1987 | Gerber ............... 56/332 |
| 4,759,731 A | 7/1988 | Uchida et al. |
| 4,862,367 A * | 8/1989 | Tada et al. ............ 701/93 |
| 4,872,857 A | 10/1989 | Newman et al. |
| 4,879,657 A | 11/1989 | Tamura et al. |
| 5,074,810 A | 12/1991 | Hobbs et al. |
| 5,110,310 A | 5/1992 | Hobbs |
| 5,665,026 A | 9/1997 | Linden |
| 5,678,651 A | 10/1997 | Kogiso |
| 5,700,171 A | 12/1997 | Horton |
| 6,234,269 B1 | 5/2001 | Salzer et al. |
| 6,295,816 B1 * | 10/2001 | Gallagher et al. ........ 60/611 |
| 6,408,831 B1 * | 6/2002 | Craig et al. ............ 123/542 |
| 6,431,930 B1 | 8/2002 | Holt |
| 6,757,606 B1 | 6/2004 | Gonring |
| 6,920,864 B1 | 7/2005 | Roche et al. |
| 8,109,303 B1 | 2/2012 | Holmes |
| 2003/0168272 A1 | 9/2003 | Ono et al. |
| 2004/0029459 A1 | 2/2004 | Berthiaume et al. |
| 2004/0038602 A1 | 2/2004 | Tanaka et al. |

FOREIGN PATENT DOCUMENTS

| | | |
|---|---|---|
| GB | 1501631 A | 2/1978 |
| JP | 59122741 | 7/1984 |
| JP | 6010236 | 6/1985 |

OTHER PUBLICATIONS

European Patent Office, Written Opinion of the International Searching Authority for PCT/US2009/049799, mailed on Feb. 24, 2010; 7 pages.

European Patent Office, International Preliminary Report on Patentability for PCT/US2009/049799, completed on Jan. 27, 2011; 13 pages.

European Patent Office, Extended European Search Report, dated Jul. 14, 2014, for European Application No. 12190686.1; 6 pages.

* cited by examiner

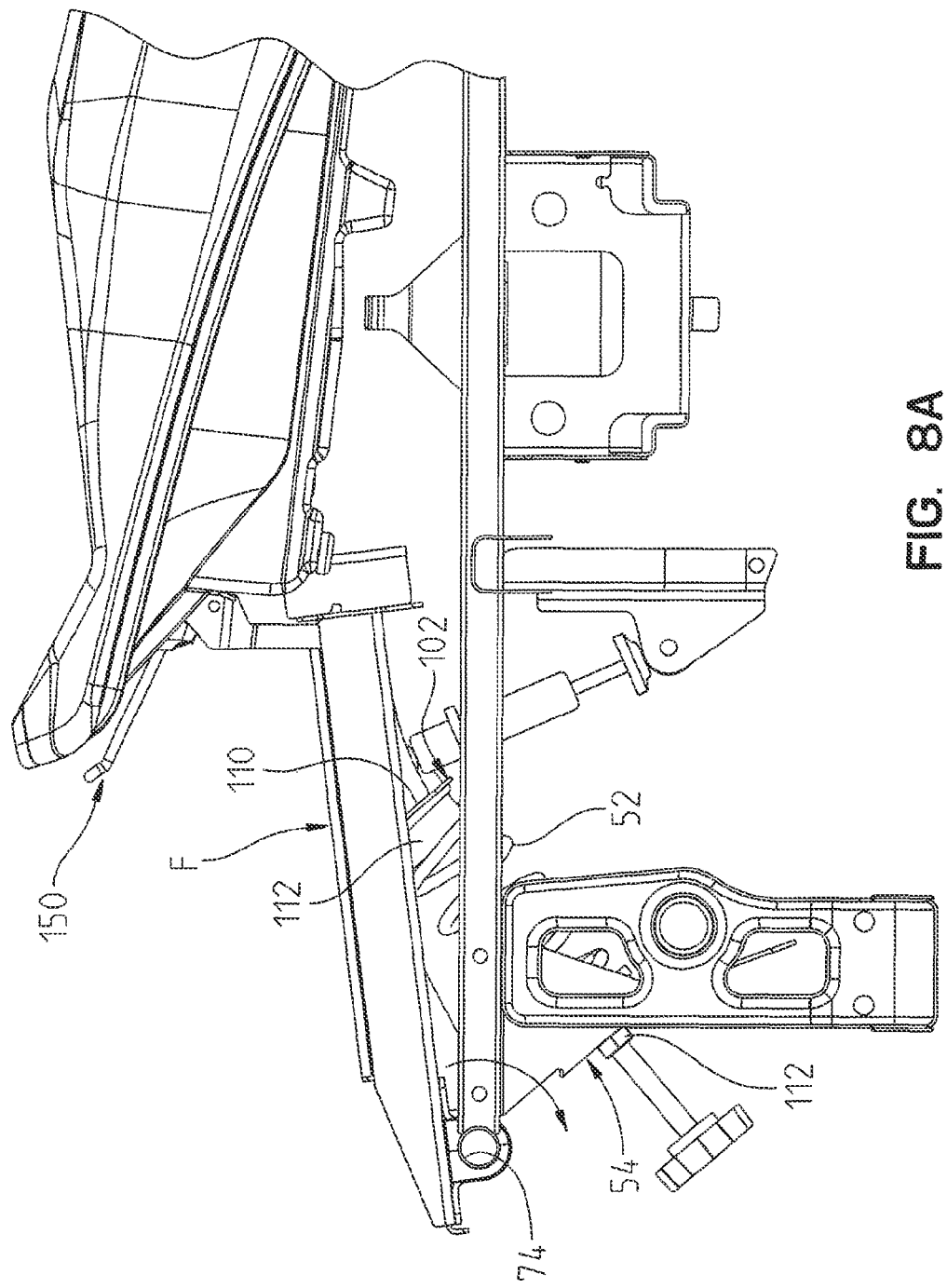

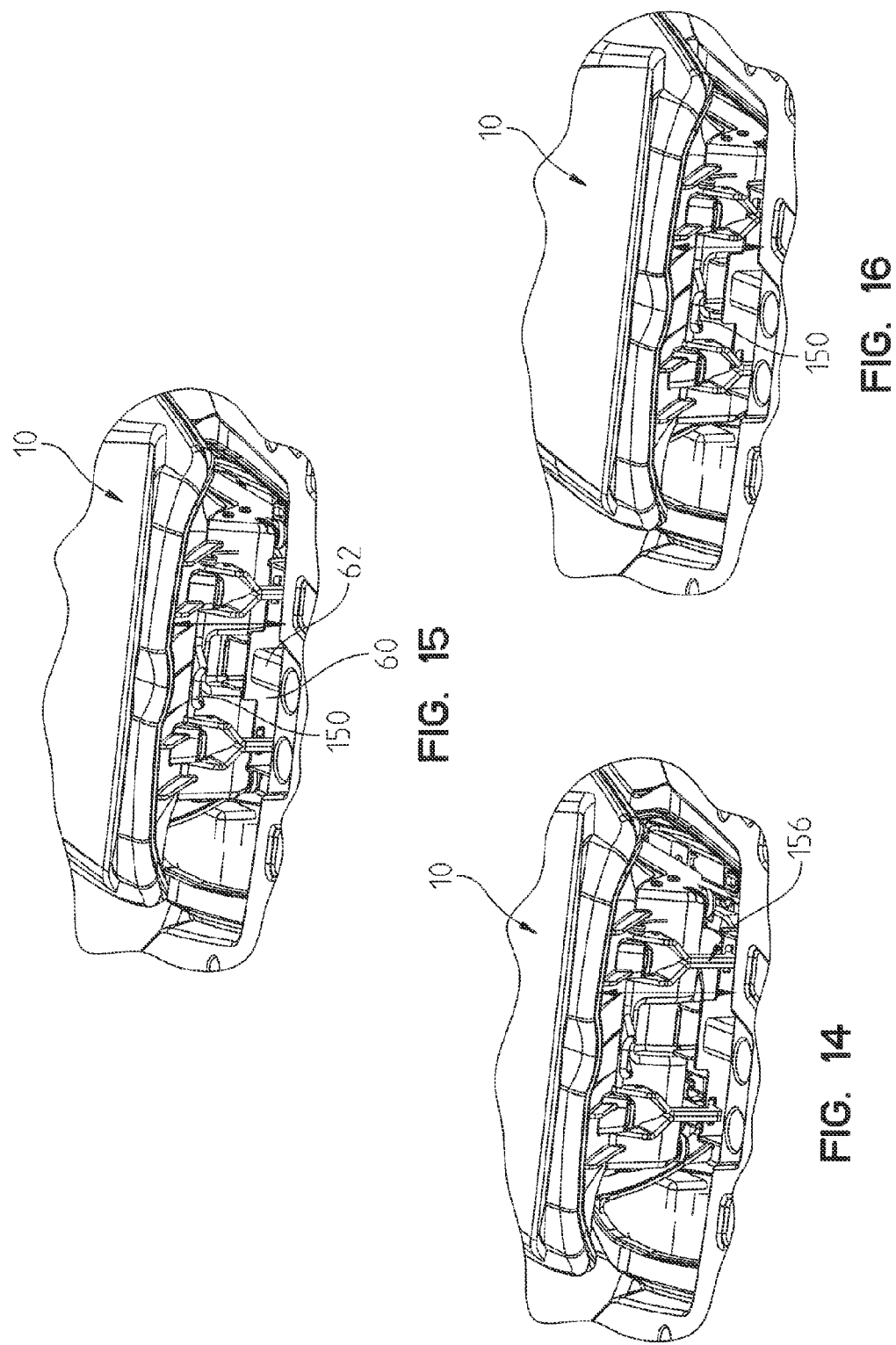

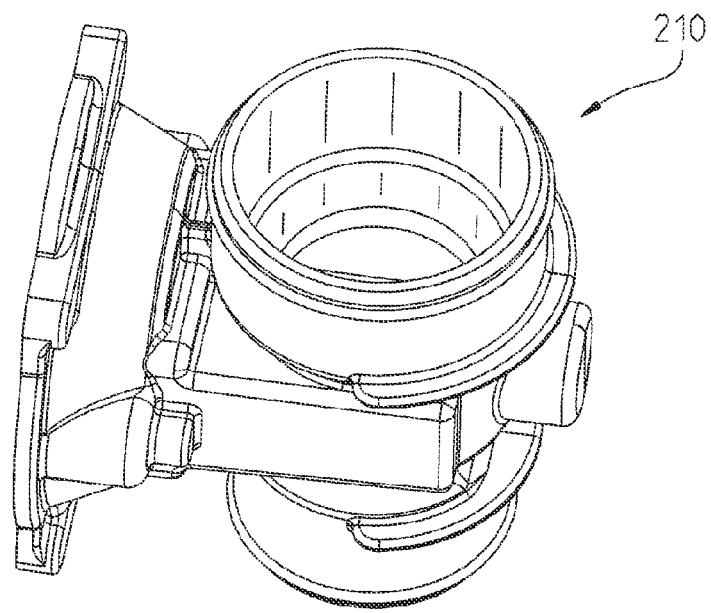
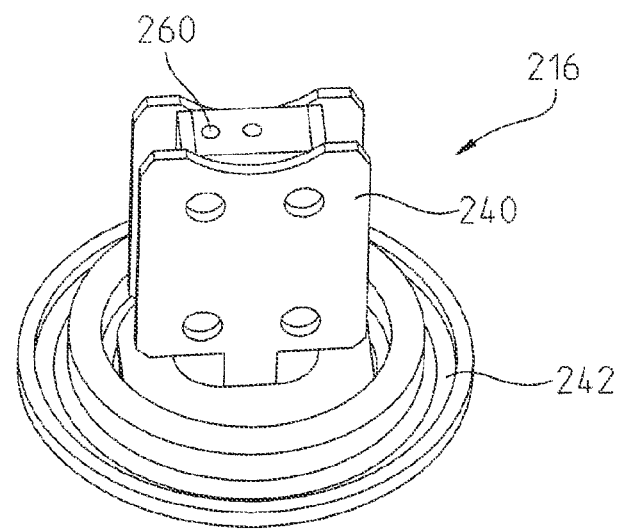
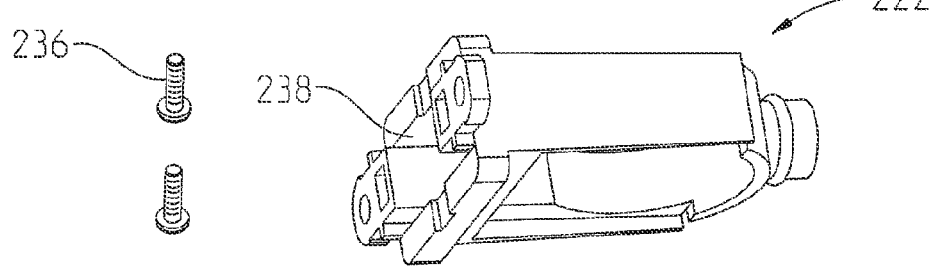
FIG. 23

VEHICLE HAVING SPEED CONTROL UNIT

RELATED APPLICATIONS

This application claims priority from U.S. Provisional Patent Application Ser. No. 61/135,864, filed Jul. 24, 2008, the subject matter of which is incorporated herein by reference.

This application is a divisional of U.S. patent application Ser. No. 12/501,944, filed on Jul. 13, 2009, and entitled "VEHICLE HAVING SPEED CONTROL UNIT," and is related to U.S. patent application Ser. No. 12/501,941, filed on Jul. 13, 2009, and entitled "TRACTOR VEHICLE," and U.S. patent application Ser. No. 13/859,541, filed on Apr. 9, 2013, and entitled "TRACTOR VEHICLE", the complete disclosures of which are expressly incorporated by reference herein.

BACKGROUND OF THE INVENTION

The present disclosure relates to vehicles which may be classified as tractors.

Many different types and styles of vehicles are used for utility purposes, and many different country laws and regulations apply to many applications. Generally, all terrain vehicles ("ATVs") and utility vehicles ("UVs") are used to carry one or two passengers and a small amount of cargo over a variety of terrains. Most ATVs include an engine including between one and three cylinders. Generally, the engine is mounted in the frame of the ATV and most ATVs include a straddle or saddle type seat positioned above the engine. The seats are typically hard mounted to the frame, and do not accommodate multiple rider variables such as height and weight.

In terms of classification for tractors, each country has a specific requirement for tractor vehicle classification. Europe has the "Council Directive of 25 Jul. 1978 on the approximation of the laws of the member states relating to the driver seat on wheeled agricultural or forestry tractors" described in (78/764/EEC) (OJ L 255, 18.9.1978, Pg. 1), the subject matter of which is incorporated herein by reference.

This Directive requires wheel vehicles to have certain characteristics in order to achieve classification as tractors. First, the position of the backrest must be adjustable (or the seat bottom and the seat back together) a minimum distance of 60 mm. A seat must also be adjustable in the vertical direction by at least 30 mm. The Directive also requires that the seat be able to follow a specific load adjustment range of between 385 Newtons (86 pounds) and 923 Newtons (207 pounds) as shown in Appendix II of the above-mentioned Council Directive. Finally, some of the directives also require a maximum speed with which the vehicle is designed.

It is an object to provide a vehicle of the ATV style, yet comply with the tractor classification.

SUMMARY OF THE INVENTION

The objects have been accomplished by providing a vehicle, comprising a frame, ground engaging elements, and an engine to motively drive one or more of the ground engaging elements. A speed control unit controls the engine and a top speed of the vehicle, and comprises an air valve positioned intermediate the air intake and the engine, a controller assembly for opening and closing the air valve, where the assembly includes a speed sensing mechanism and a controlling unit for opening and closing the air valve.

In another embodiment, a vehicle comprises a frame, ground engaging elements, an engine for motively driving one or more of the ground engaging elements and an air valve positioned intermediate an air intake and the engine. The air valve is comprised of a valve body having an upper end, and a lower end having an intake side and an exhaust side. A gate valve member is positioned within the valve body and is operated by a guillotine, and the gate valve provides opened and closed positions. A diaphragm is positioned at the valve body upper end and is operatively connected to the guillotine. A first pressure chamber is defined above and a second pressure chamber is defined below, the diaphragm. An aperture extends through the diaphragm connecting the first and second pressure chambers.

In yet another embodiment, a vehicle comprises a frame, ground engaging elements; an engine for motively driving one or more of the ground engaging elements, and an air valve positioned intermediate an air intake and the engine. The air valve is comprised of a valve body having an upper end, and a lower end having an intake side and an exhaust side, the intake side comprises a raised and contoured section. A gate valve member is positioned within the valve body and is operated by a guillotine. The gate valve member provides opened and closed positions, wherein in the closed position, the gate valve member is positioned behind the raised and contoured section. A diaphragm is positioned at the valve body upper end and operatively connects to the guillotine. A first pressure chamber is defined above and a second pressure chamber is defined below, the diaphragm.

BRIEF DESCRIPTION OF THE DRAWINGS

FIG. 8A is a right side view of the tractor shown in FIG. 6;

FIG. 14 shows an end view looking towards the seat height adjustment assembly with the locking pawl in the uppermost locking aperture;

FIG. 15 shows a view similar to that of FIG. 14 with the locking pawl in the middle locking aperture;

FIG. 16 shows a view similar to that of FIG. 14 with the locking pawl in the lowest locking aperture;

FIG. 23 is a view showing multiple component parts of the speed control unit;

DETAILED DESCRIPTION OF THE EMBODIMENT

Figure 1:
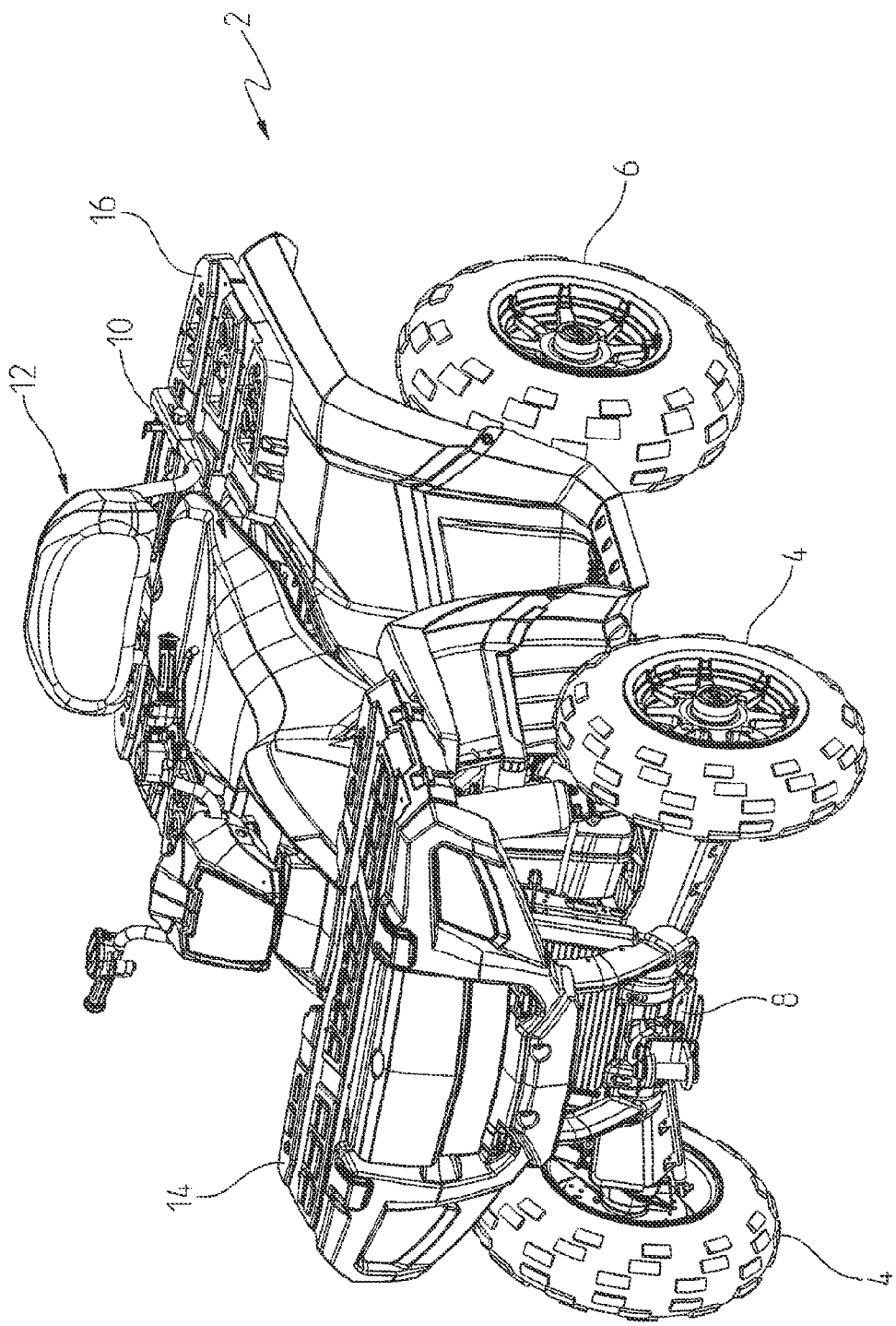
FIG. 1 is a left front perspective view of a tractor of the present disclosure.
Figure 2:
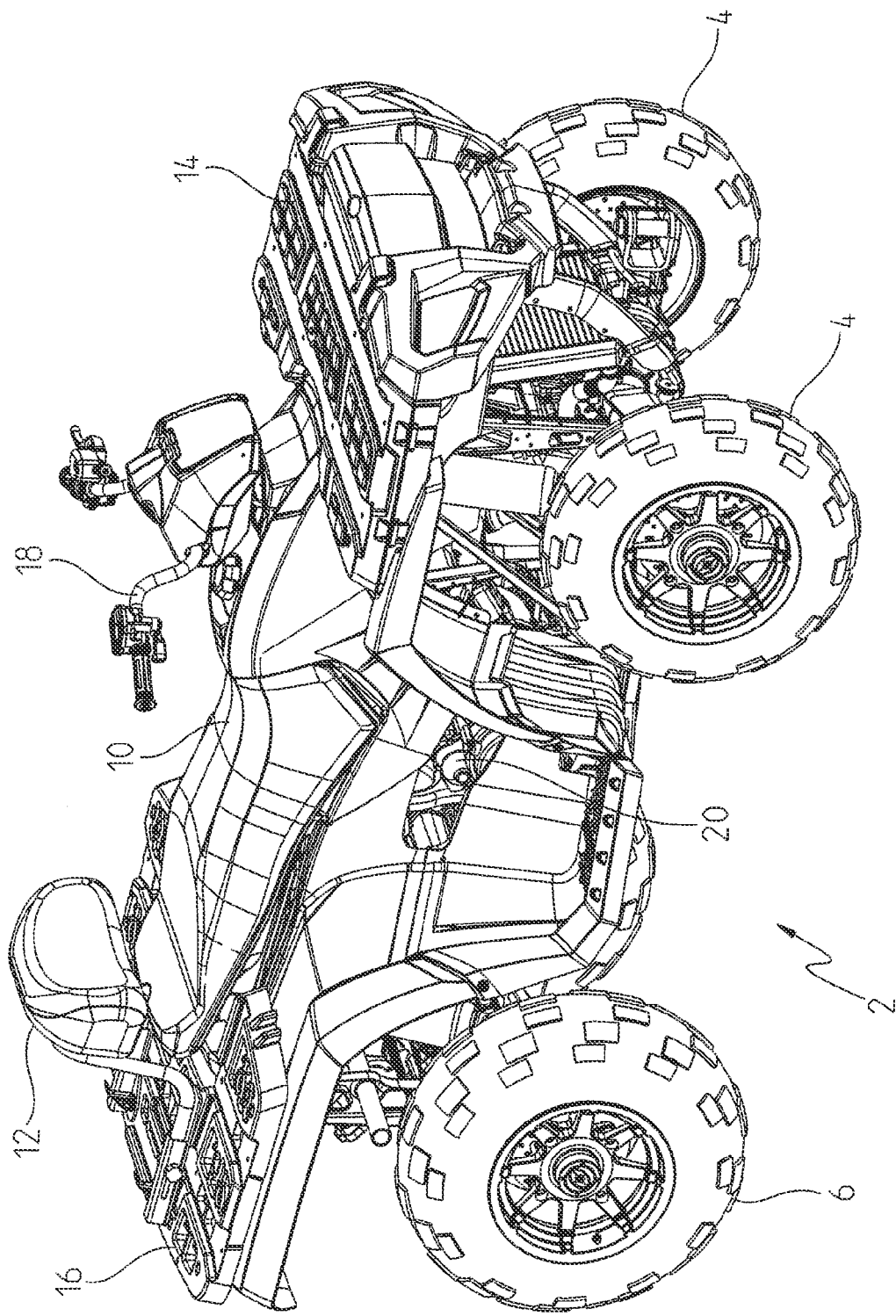
FIG. 2 is a left rear perspective view of a tractor of the present disclosure.
Figure 3:
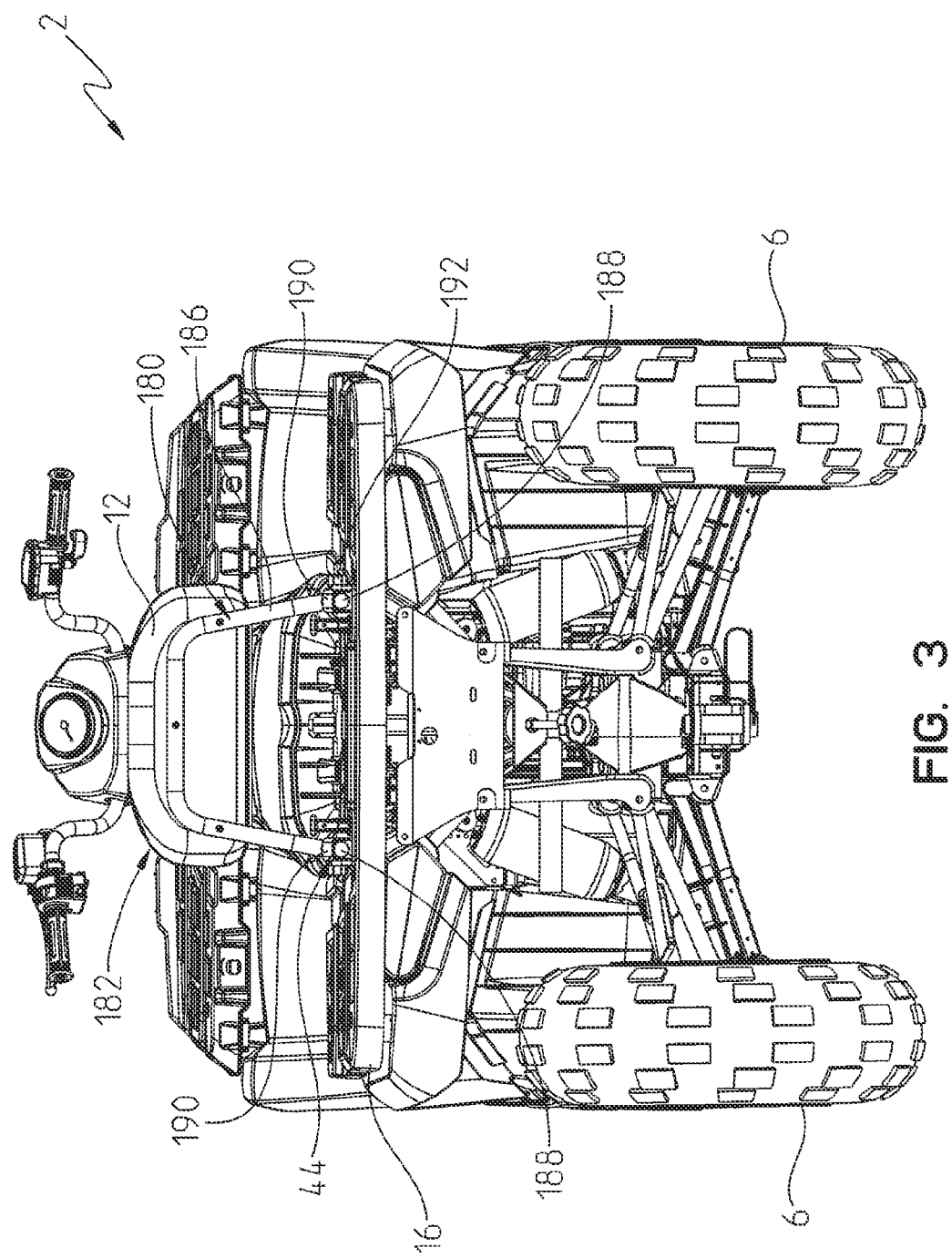
FIG. 3 is side view of the tractor.

With reference first to FIGS. 1-3, the tractor is shown generally at 2. The tractor 2 is of the type of a four-wheel drive vehicle having front drive wheels 4, and rear drive wheels 6 which support a frame 8 of the tractor. The tractor 2 also includes a seat 10 for a single rider, having a backrest at 12 with a front utility rack 14 and a rear utility rack 16. The tractor is steerable by way of a steering assembly 18 and is motively projected by way of a drive train at 20 (FIG. 2).

With reference now to FIGS. 4-8, frame 8 is shown in greater detail. Frame 8 is generally comprised of a longitudinally extending upper frame portion 26 which is generally comprised of longitudinally extending frame members 28 held in a fixed relation by way of a crossbar 30. A lower frame member 32 is rigidly attached to the upper frame member 26 by way of frame uprights 34, 36 and 38. The tractor 2 also includes an enhanced rider area which is comprised of a seat height adjustment assembly shown generally at 40, a seat load adjustment assembly shown generally at 42 and a backrest fore/aft assembly shown generally at 44 (FIG. 3).

Figure 8B:
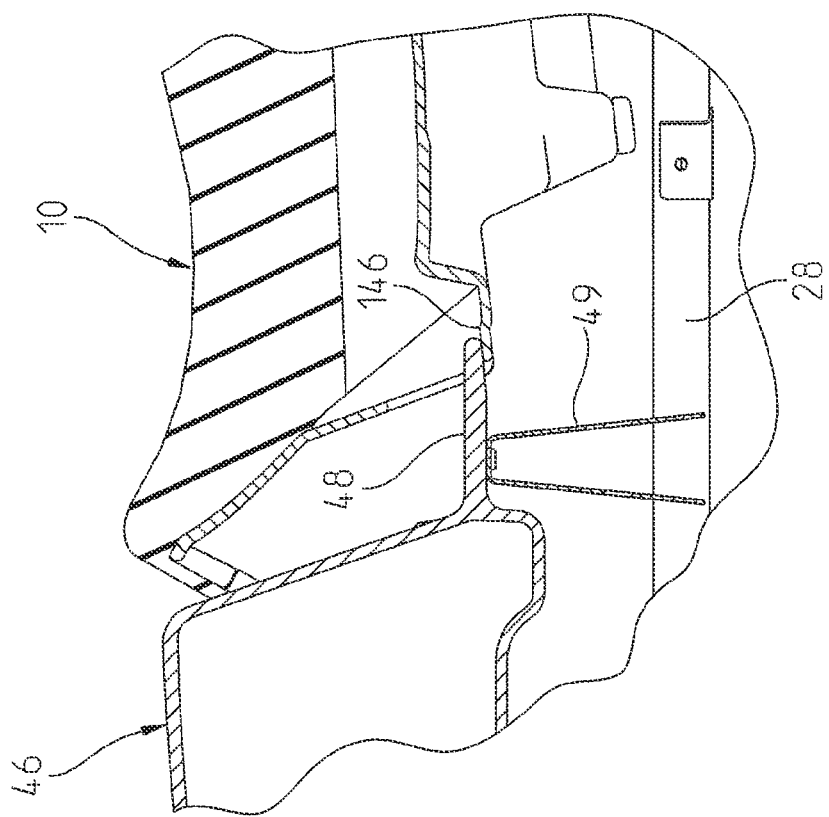
FIG. 8B is a cross-section view through the vehicle gas tank and seat.
Figure 19:
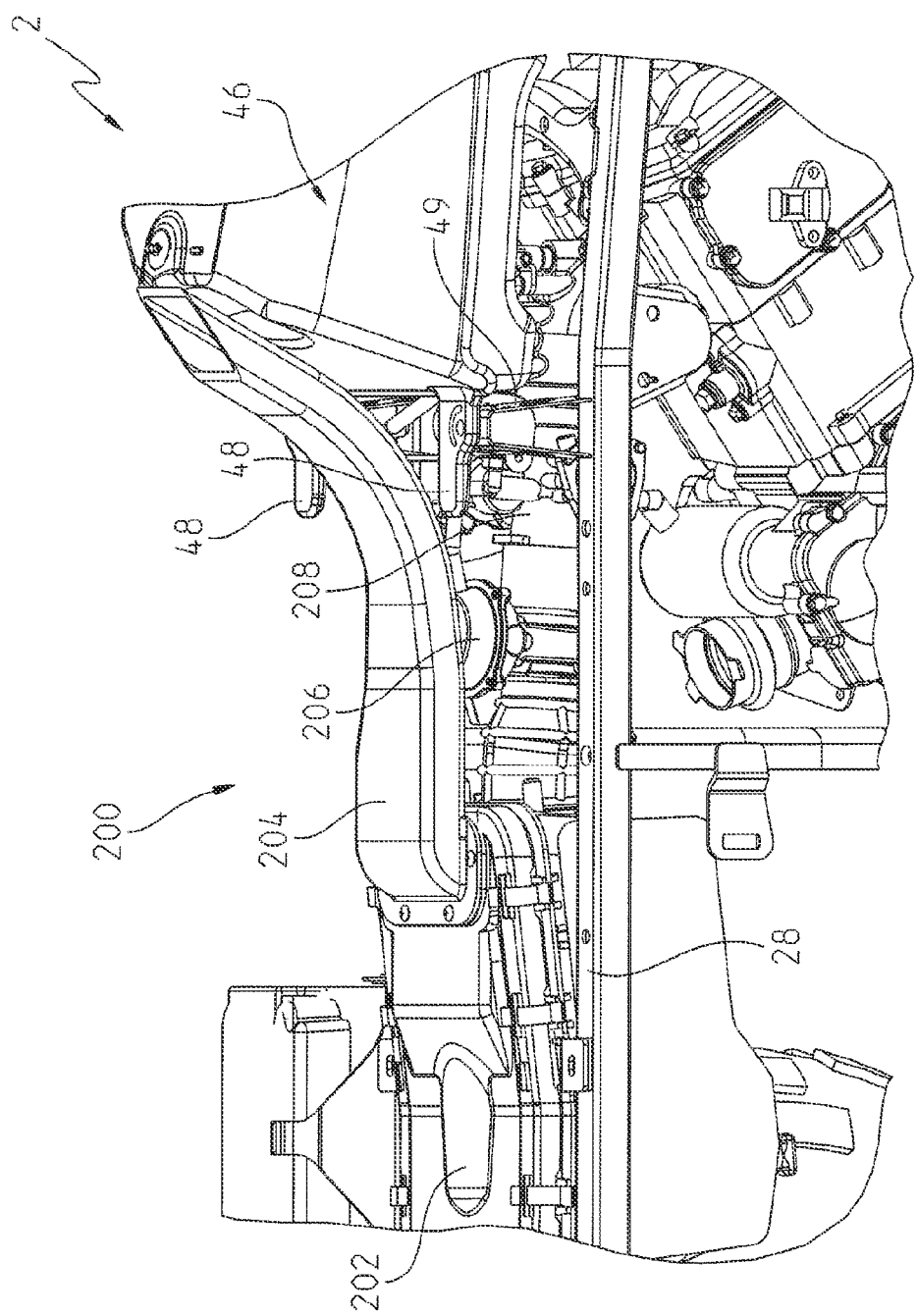
FIG. 19 is a perspective view showing the air intake system, and a speed control unit mounted to the throttle valve.
Figure 20:
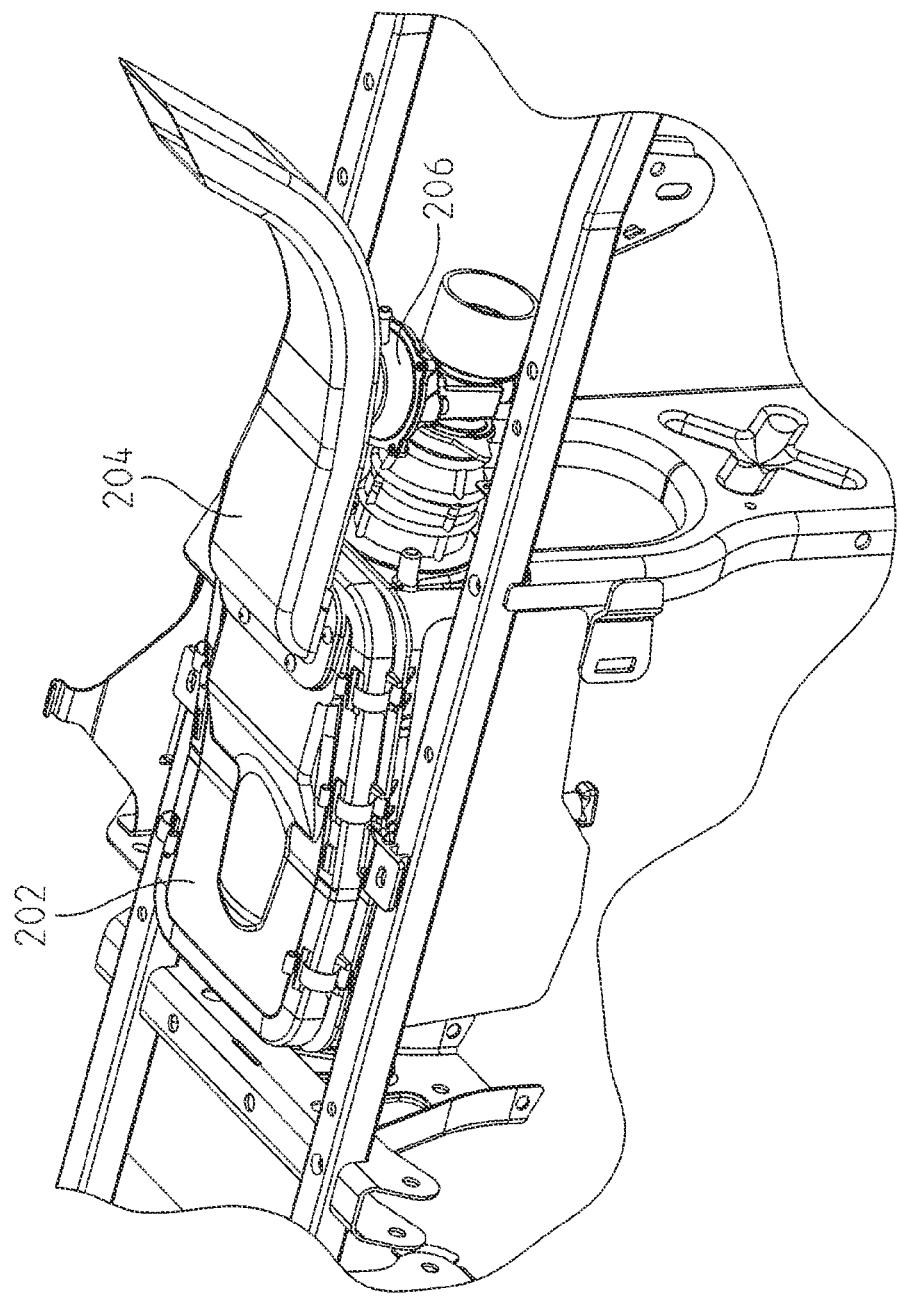
FIG. 20 is a perspective view similar to that of FIG. 19 without the engine and throttle valve in place.
Figure 21:
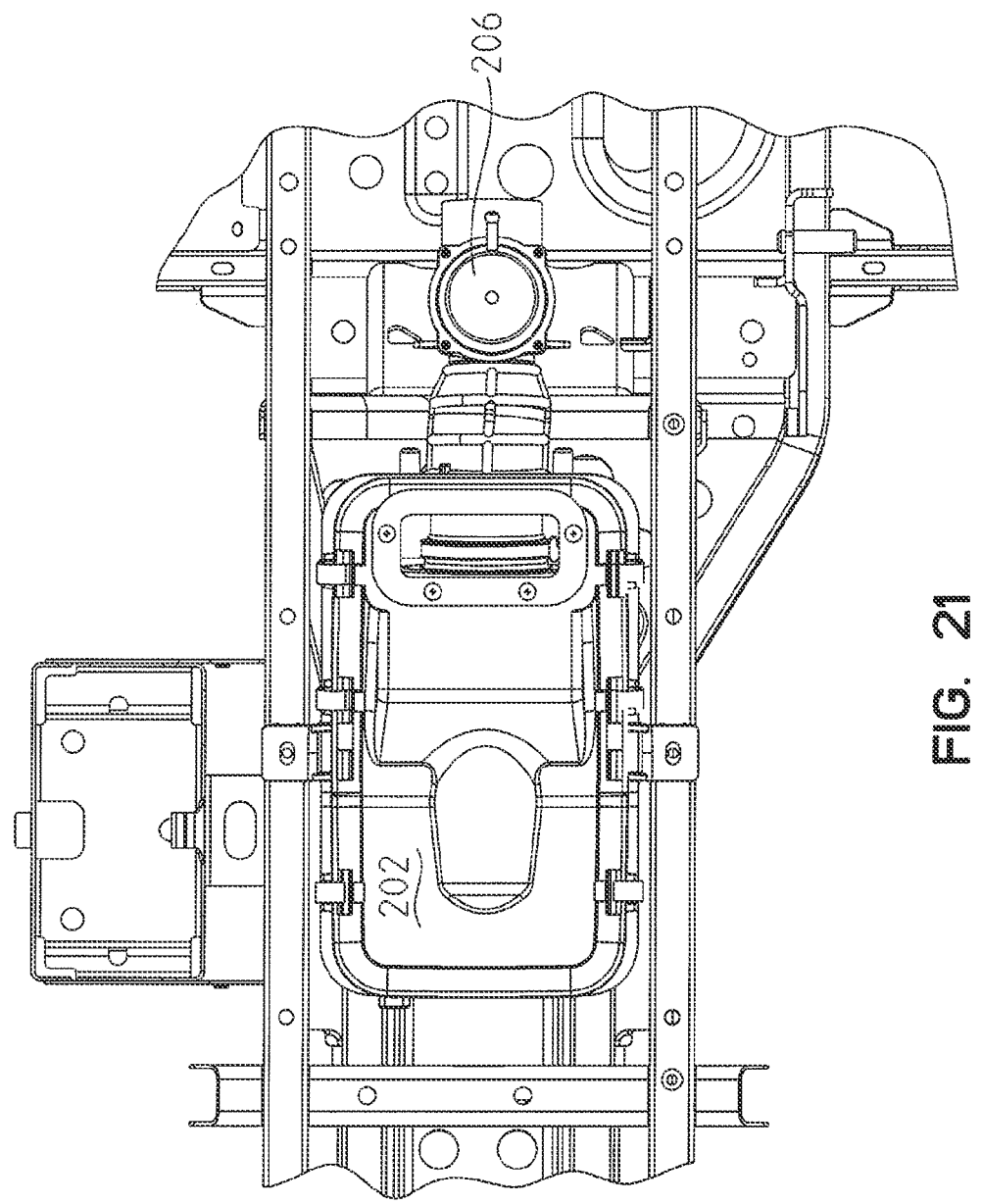
FIG. 21 is a top view of the tractor similar to that shown in FIG. 20.

With respect to FIGS. 8B and 19, a forward portion of frame 26 is shown, specifically frame members 28. Fuel tank 46 is attached to frame 26, by way of depending legs 48 attached to standoffs 49. Depending legs 48 extend rearwardly from standoffs in a cantilevered fashion, as described further herein.

With respect again to FIGS. 4-8, seat load adjustment assembly 42 will be described in greater detail. Seat load adjustment assembly 42 is generally comprised of a load frame 50, a coil spring assembly 52 and a spring retainer 54. With respect to FIGS. 4 and 5, frame 50 is shown comprised of side plate members 56 attached at one end to a rear bracket 58 and at the opposite end to a front plate 60. Front plate 60 also cooperates with the adjustable seat height assembly 40 as will be described herein. Frame 50 also includes a channel 62 which extends between plate 60 and bracket 58. Channel 60 is open on an underside thereof and includes attachment apertures 64 (FIG. 5) as described herein. As shown best in FIG. 5, frame 50 includes hinge plates 70 which are fixed to the bottom of plate members 56, and which flank a bushing 72. This allows frame 50 to be pivotally mounted on end tube 74 which spans between frame members 28. As should be appreciated, this allows the entire frame assembly 50 to pivot relative to the frame 8. Finally, and with respect to FIG. 4, front plate 60 includes a plurality of vertically spaced apertures 80, and an alignment block 82 as further described herein.

With respect again to FIGS. 4 and 5, spring retainer 54 includes a rear plate 90 and side plates 92 which terminate in side flanges 94 which in turn are attached to inside surfaces of frame members 28. With reference now to FIGS. 6 and 7, the mounting of spring 52 will be described in greater detail. Spring 52 is a compression spring and is shown trapped between a rear retainer 100 and a front retainer 102. Rear retainer 100 includes an enlarged portion 104, where the enlarged portion 104 has a larger profile than the outside diameter of the coil spring 52, and is positioned on the inside of spring retainer 54. The retainer 100 also includes an inside diameter portion 106 having a diameter smaller than the inside diameter of coil spring 52 to seat within the coil spring 52. Rear retainer 100 would also be attached to a jack screw 110 (see FIGS. 5 and 6), which when threaded through nut 112 pushes on rear retainer 100, and resultantly increases the compression spring force in coil spring 52.

With respect to FIGS. 7 and 8, upper retainer 102 includes an enlarged portion 110 having a larger profile than the coil spring 52 and a reduced diameter section 112 which has a smaller diameter that coil spring 52 and seats inside coil spring 52. It should be appreciated that enlarged portion 110 would include an anchor (not shown) having an aperture through which a pin may be attached to a rearward one of apertures 64 (FIGS. 4-5) to attach the top end of coil spring 52 to the center channel 62. It should be appreciated then that a downward force F (see FIG. 8) on a front portion of frame 50 allows frame 50 to pivot under spring force about tube 74 in the direction shown in the arrow as shown in FIG. 8. It should also be appreciated that the compressive spring force in spring 52 is controllable through jackscrew 110.

While spring retainer 54 is fixed, coil spring can pivot about retainer 100 during this pivotal movement. However, it also possible to mount spring retainer 54 in a rotatable sense relative to rear tube 120 or to fix spring retainer 50 to rear tube 120 and allow tube 120 to rotate relative to uprights 34.

Figure 5:
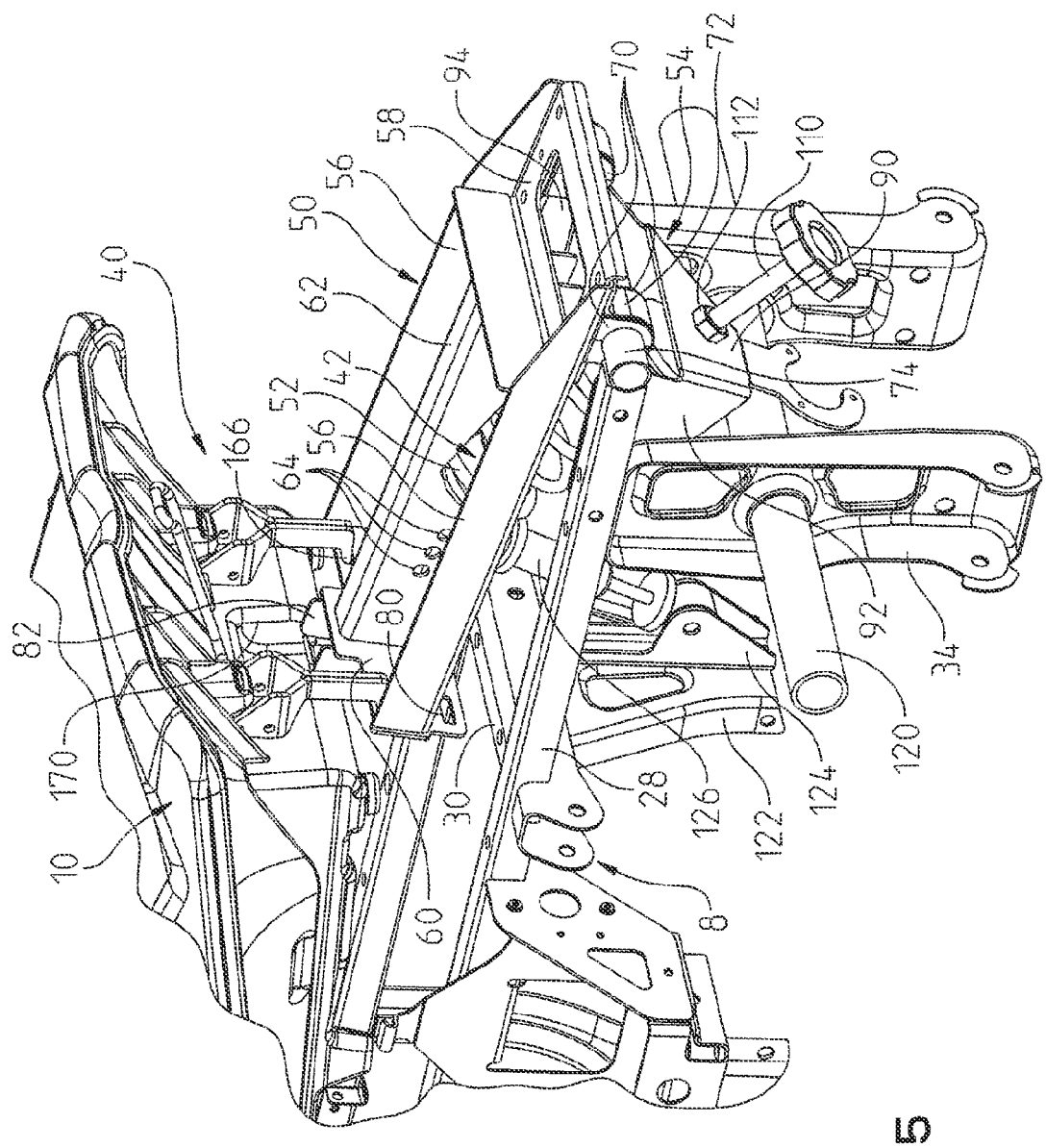
FIG. 5 is a rear perspective view similar to that of FIG. 4.
Figure 6:
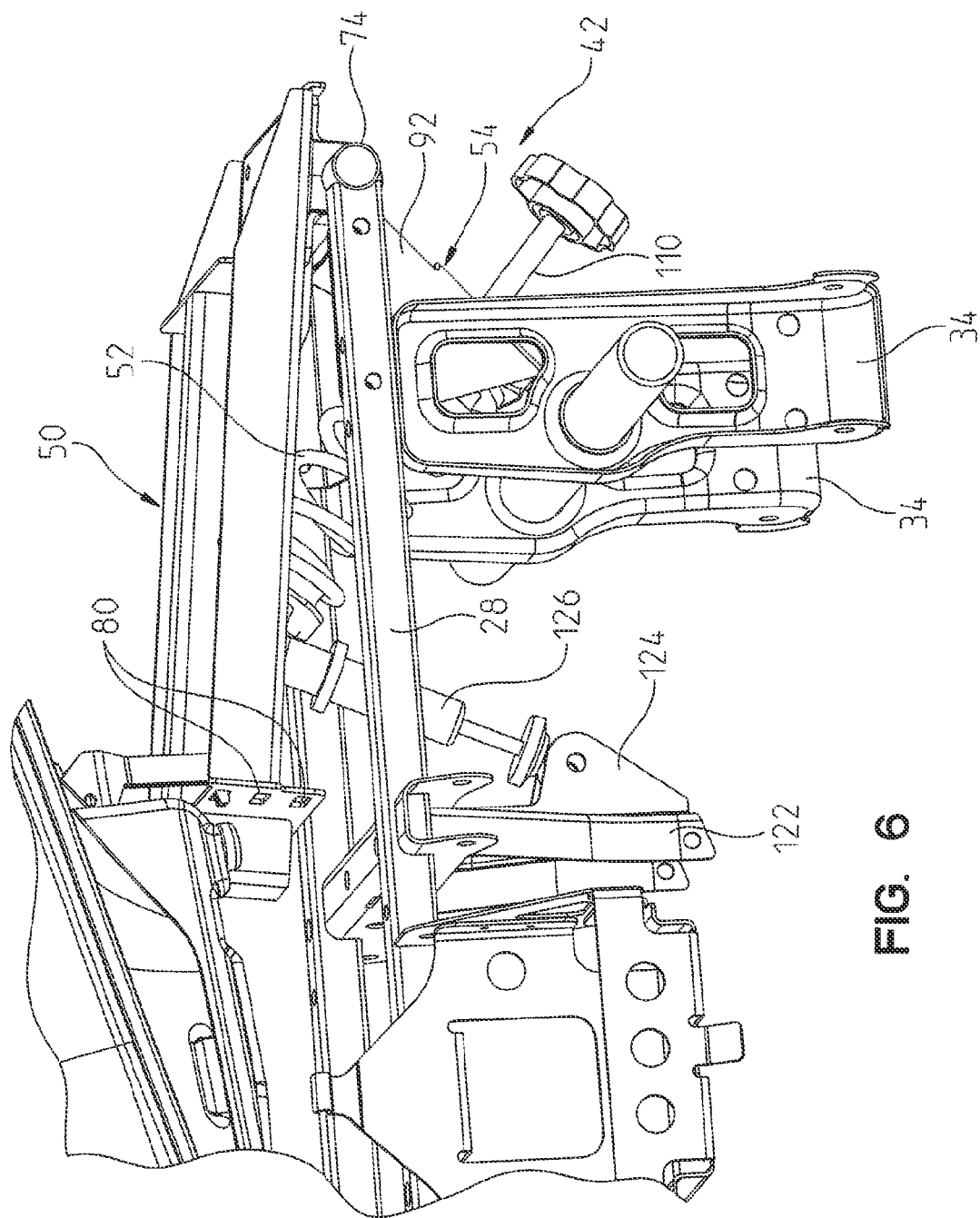
FIG. 6 is a left side perspective view similar to that of FIGS. 4 and 5.
Figure 7:
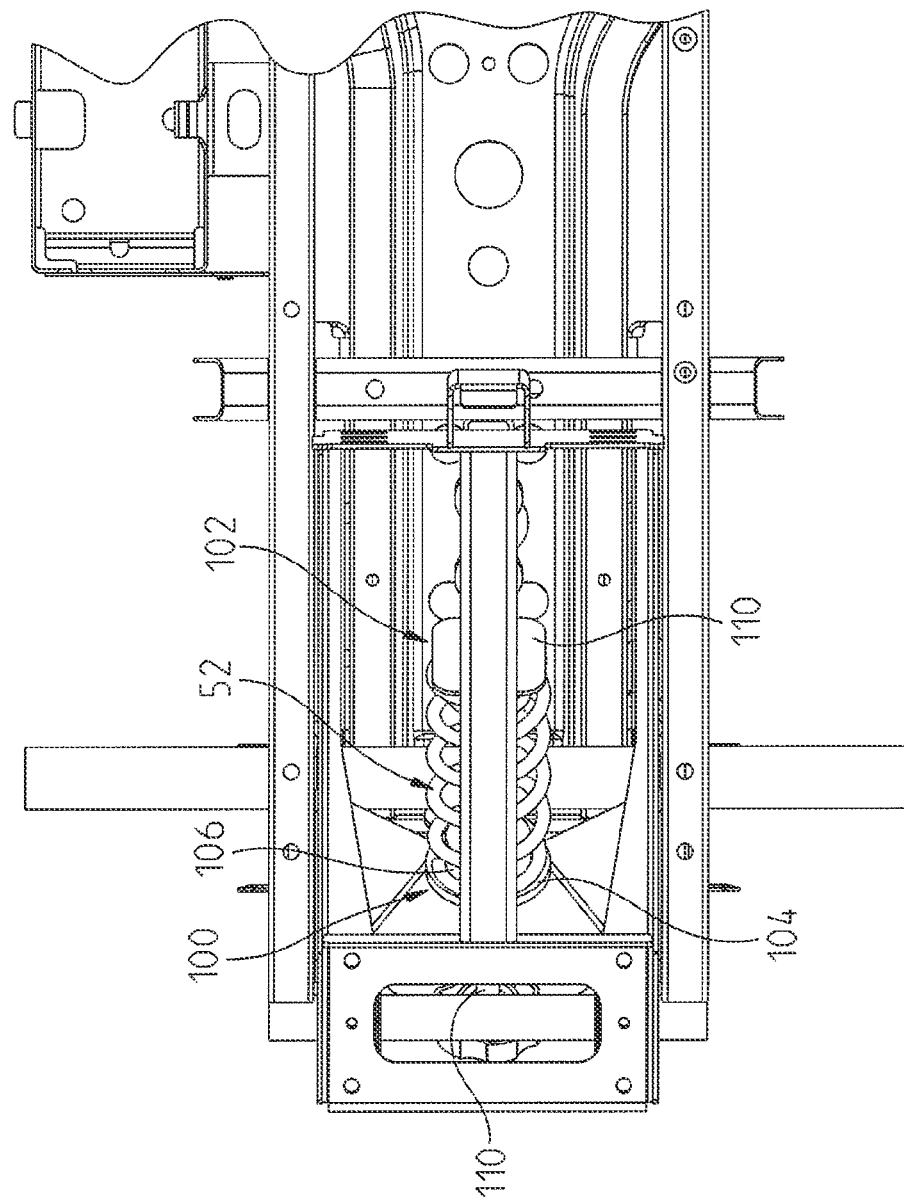
FIG. 7 is a top view of the tractor frame shown in FIG. 6.

With respect now to FIGS. 5 and 6, a dampening assembly is shown to comprise an upright 122 attached to the crossbar 30, with a channel 124 attached to upright 122. A shock or damper 126 is positioned between channel 124 and between apertures 64 in channel 62 (see FIG. 5).

Figure 9:
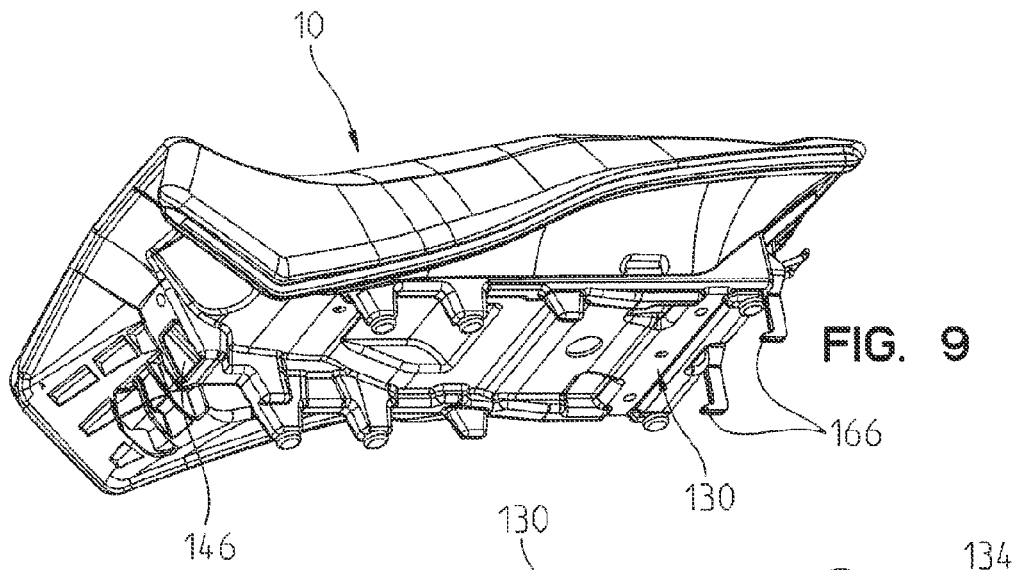
FIG. 9 is a lower perspective view of the seat.
Figure 10:
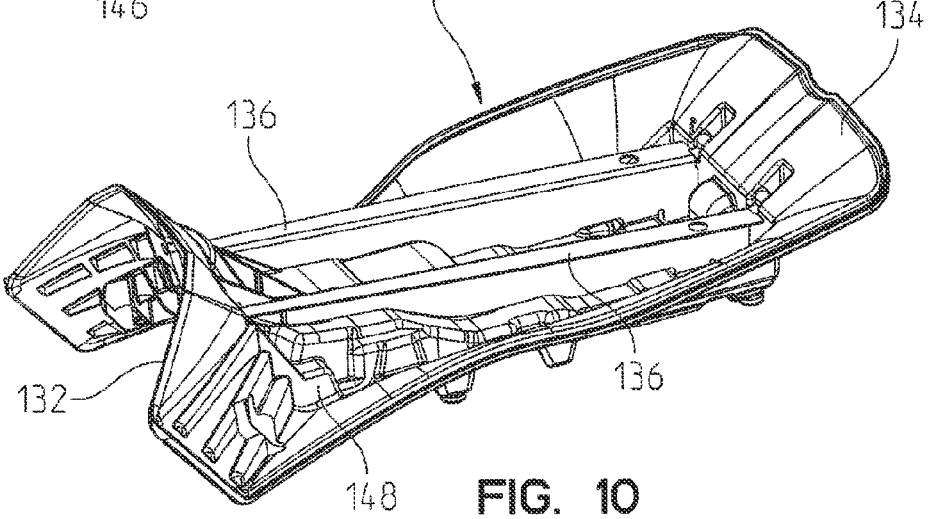
FIG. 10 shows a top perspective view of the seat frame.
Figure 11:
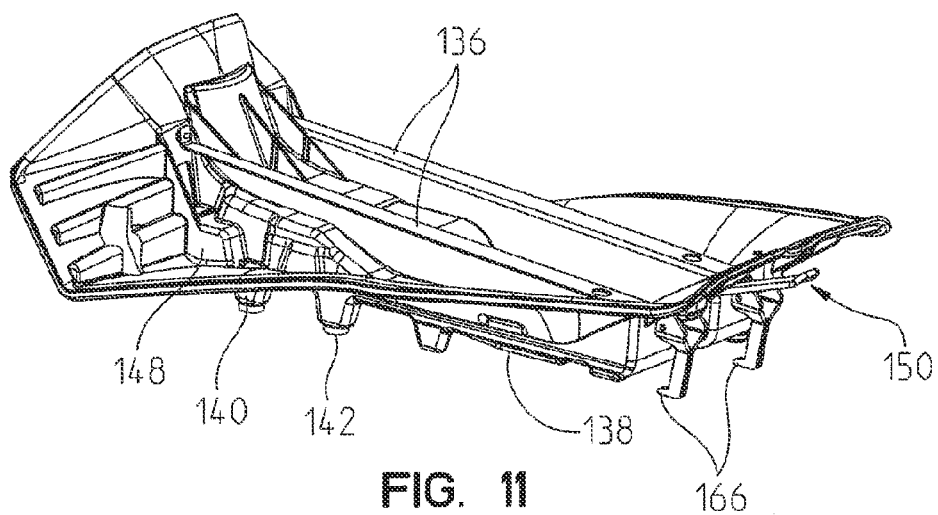
FIG. 11 shows a rear perspective view of the seat frame of FIG. 10.

With respect now to FIGS. 9-11, seat 10 will be described in greater detail. Seat 10 is comprised of a base portion 130 having a front section 132 and a rear section 134, with structural ribs 136 fastened therein and extending between the front and rear sections 132, 134. Ribs 136 are shown as riveted, but could be fixed by integral molding, adhesives, or other known fasteners. FIG. 9 shows seat 10 with the base portion 130 with the padding, whereas FIGS. 10 and 11 show only the base portion 130. Base portion 130 also includes a lower surface 138 having posts 140 extending therefrom having rubber stops at 142. As shown best in FIG. 9, seat base 130 is rigidified with steel ribs 144 attached to the posts 140. As shown in FIG. 9, base front 132 includes two openings 146 (only one of which is visible) positioned within molded pockets 148. Finally as shown in FIG. 11, seat frame 130 is equipped with a height adjustment latch assembly shown at 150.

With respect again to FIG. 4, seat adjusting latch 150 comprises a lever 152 having two pin portions 154 extending through a clevis jaw 156 where the clevis jaw has an upper portion 158 which flanks a molded portion 160 of seat frame 130. Pin portions 154 are fixedly attached to clevis jaws 156, and clevis jaws 156 rotate about an axis through pins 154 upon movement of handle 152. Clevis jaw 156 also includes a locking pawl 166 (FIG. 5) which locks with one of the apertures 80 in front plate 60. It should be appreciated that latch assembly 150 includes a torsional spring 168 such that the clevis jaw 156 is normally biased against the plate 60 with the pawls 166 in a locked condition within the apertures 80.

Figure 4:
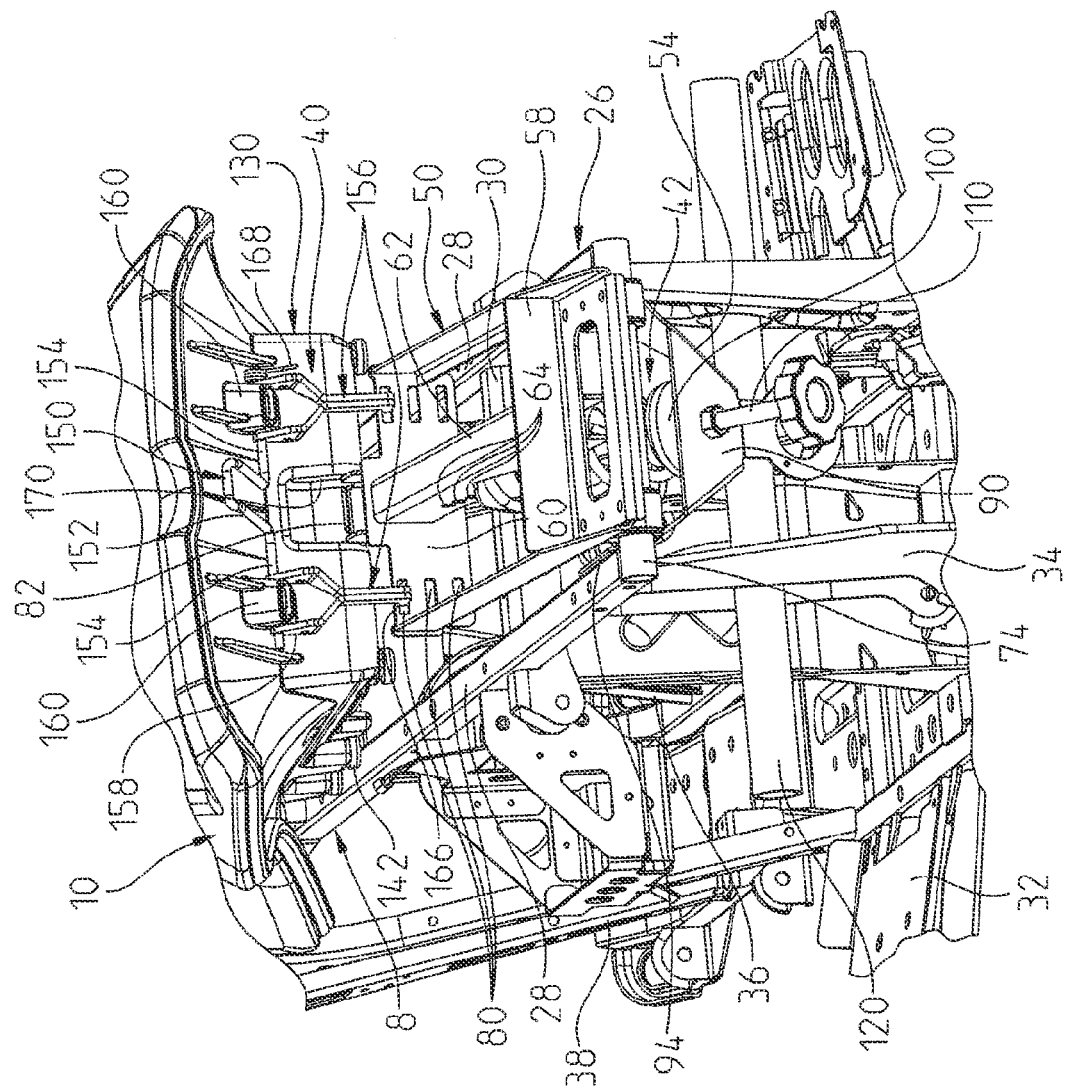
FIG. 4 is a rear perspective view of the tractor frame showing the seat load adjustment assembly and the seat height adjustment assembly.

As also best shown in FIG. 4, seat frame 130 includes a recess 170 which aligns with and receives alignment block 82 to allow the seat to pivot upwardly and downwardly, but prevents movement of the seat frame 130 in a lateral sense. As shown best in FIG. 4, rubber stops 142 are aligned with frame members 28 to prevent hard engagement of the seat frame 130 with the frame members 28 in a jounce situation. Seat 10 is held in position with depending legs 48 positioned in openings 146 (see FIG. 8B), by block portion 82 positioned in opening 170 (see FIG. 4), and with latch assemblies 150 positioned within apertures 80 of plate 60.

Figure 12:
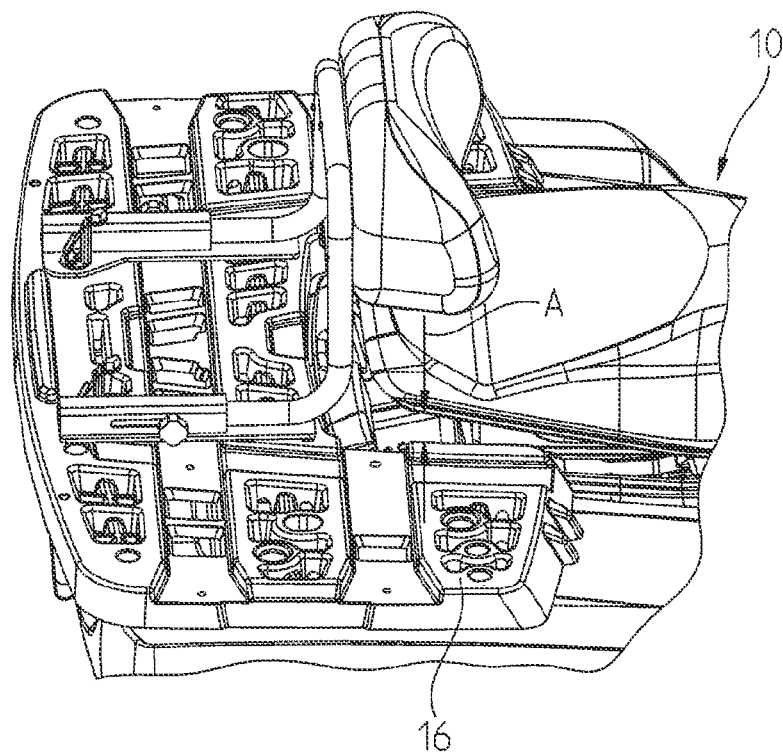
FIG. 12 shows a partially fragmented perspective view of the seat in the fully raised position.
Figure 13:
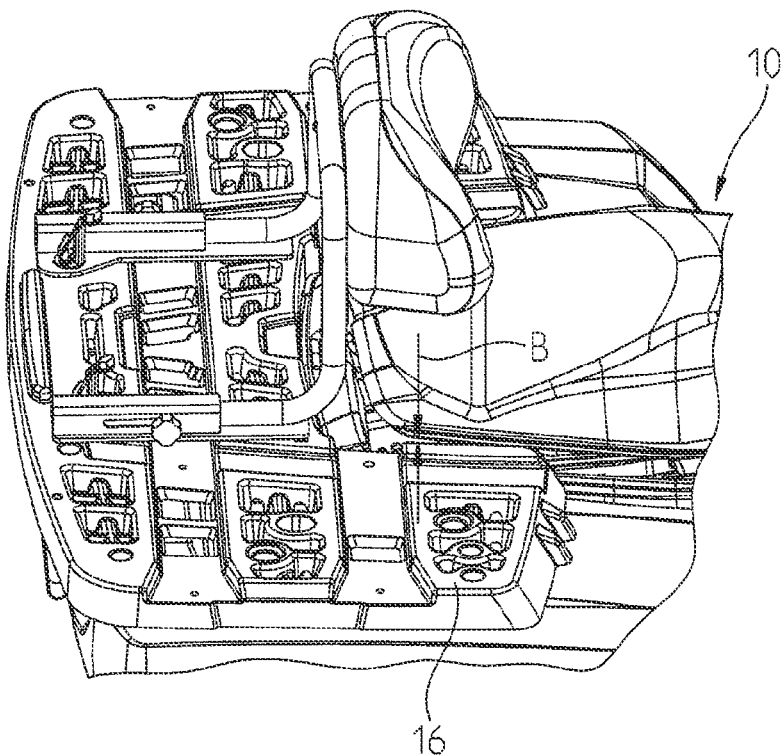
FIG. 13 shows the seat of FIG. 12 in the fully lowered position.

As shown in FIGS. 12 and 13, the seat 10 may move through extreme positions A and B as measured from the utility rack 16. FIGS. 14-16 also show the seat position with the locking pawls 166 in the various apertures 80. As shown between the comparison of FIGS. 12 and 13, the seat has a vertical movement of 42.926 mm/1.69".

Figure 17:
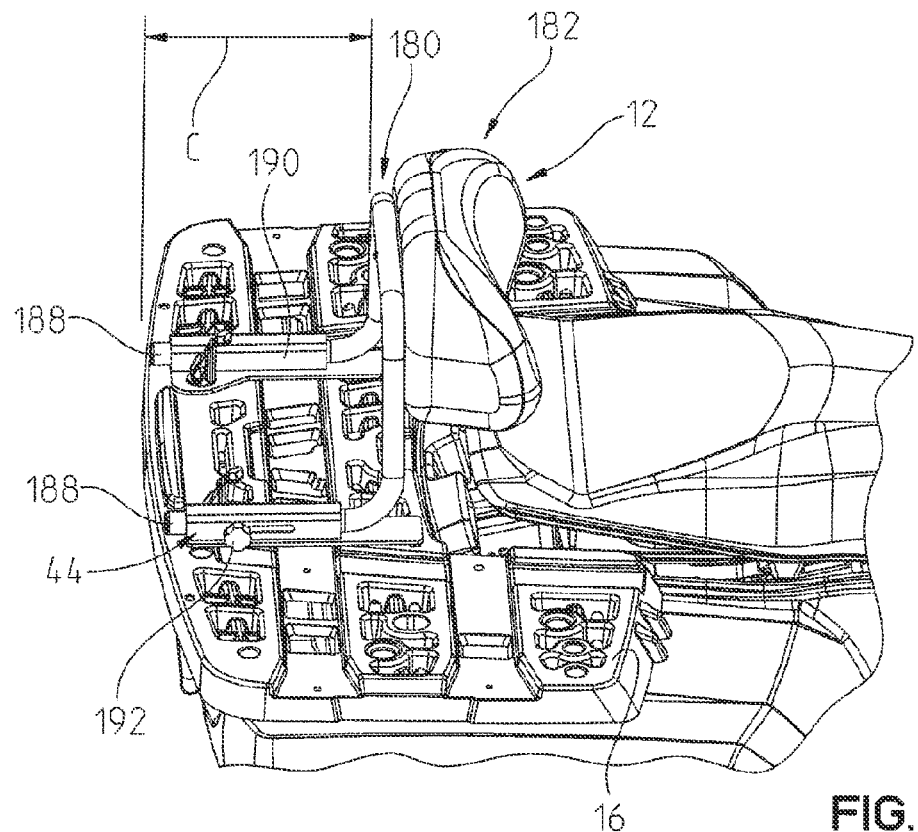
FIG. 17 is a perspective view showing the seat back in the rearward most position.
Figure 18:
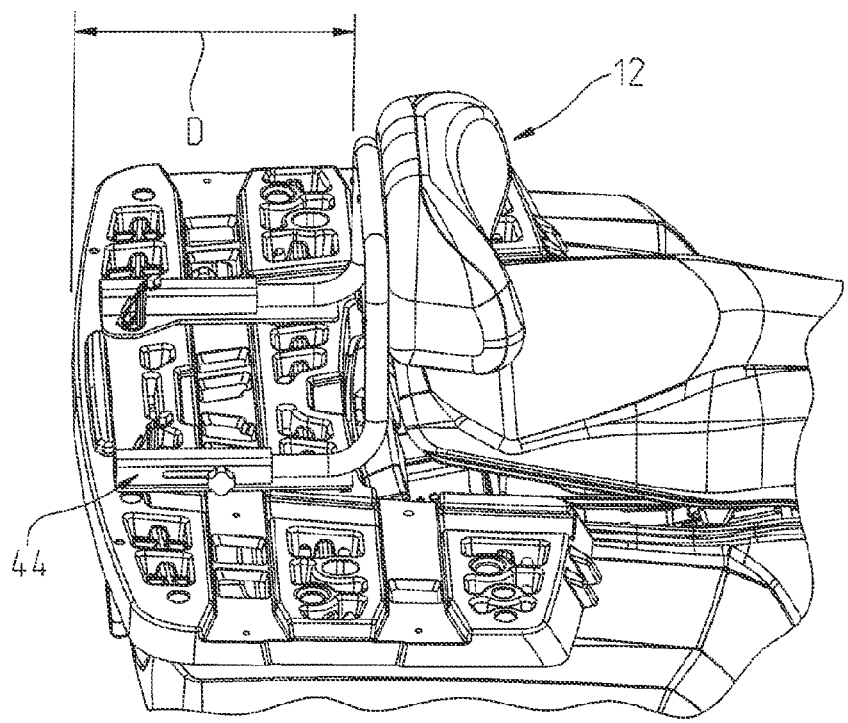
FIG. 18 is a perspective view showing the seat back in the forward most position.

With respect to FIGS. 3 and 17, the seatback adjustment assembly 44 is comprised of tubular frame member 180 attached to seat back padding 182, and locking channels 190 fixedly attached to rear rack 16. Frame portion 180 also includes a horizontally extending portion 188 positioned within locking channels 190 which are locked by way of a threaded thumb wheel 192. It should be appreciated that when the thumb wheels 192 are loosened and retracted, the horizontal tube portions 188 may move forwardly and backwardly within the channels 190 to allow the user to position the seatback in a number of various locations, and can lock the seatback to any position between extreme positions. FIGS. 17 and 18 show those extreme positions, where the difference between positions C and D allows 60 mm of travel for the seat back.

As designed the tractor 2 meets all of the directives as mentioned above. The seat back moves forwards and backwards as disclosed in FIGS. 17-18. The seat also meets the seat load characteristics by providing the pivotal suspension frame 50 with the spring 52 loaded upon a force on the seat. The spring rate of the spring as disclosed is 170 $lb_f$ per inch of compression, which allows an approximate load variance for the embodiment shown, of between 155 N and 1200 N and. The height variance is accomplished by interconnection of the end of the seat to the front end of the suspension frame 50.

With reference now to FIGS. 19-25, a speed control device for the tractor will be described. With reference first to FIG. 19, the tractor 2 is shown having an air intake system shown generally at 200 comprising an airbox 202, an air intake snorkel 204 connected to the airbox 202, a speed control unit 206 connected intermediate the airbox 202 and a throttle valve 208. It should be appreciated that the throttle valve is attached to the air intake of the engine of the tractor in a known manner.

Figure 22:
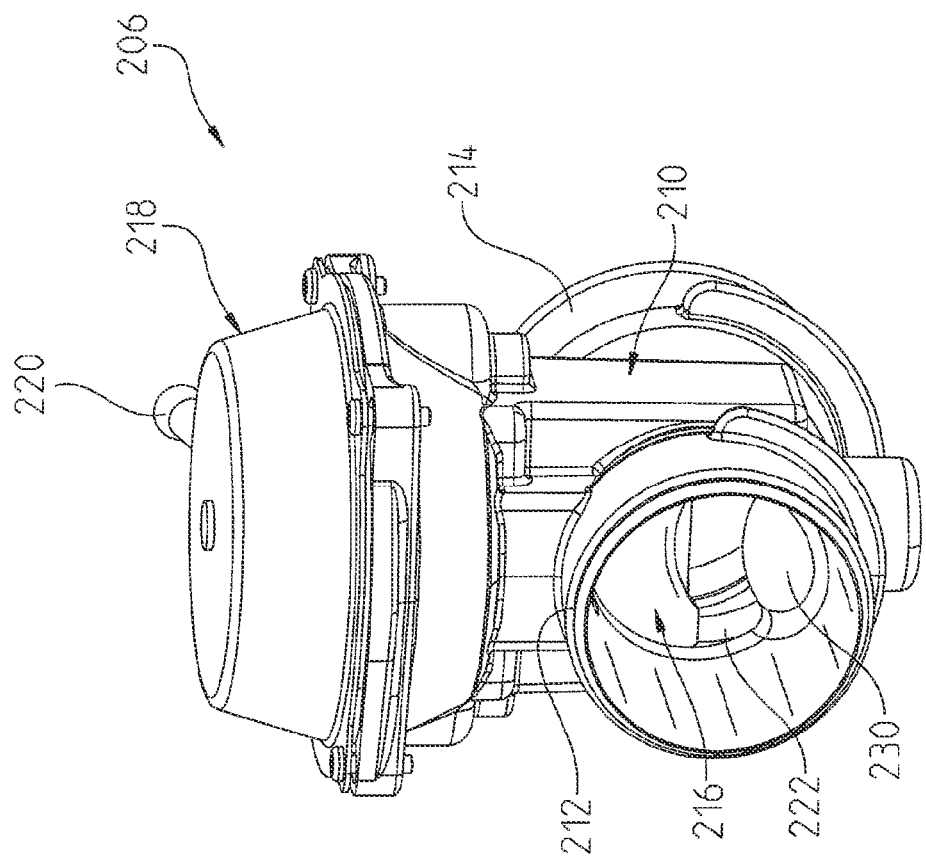
FIG. 22 is a perspective view of the valve of the speed control unit.
Figure 24:
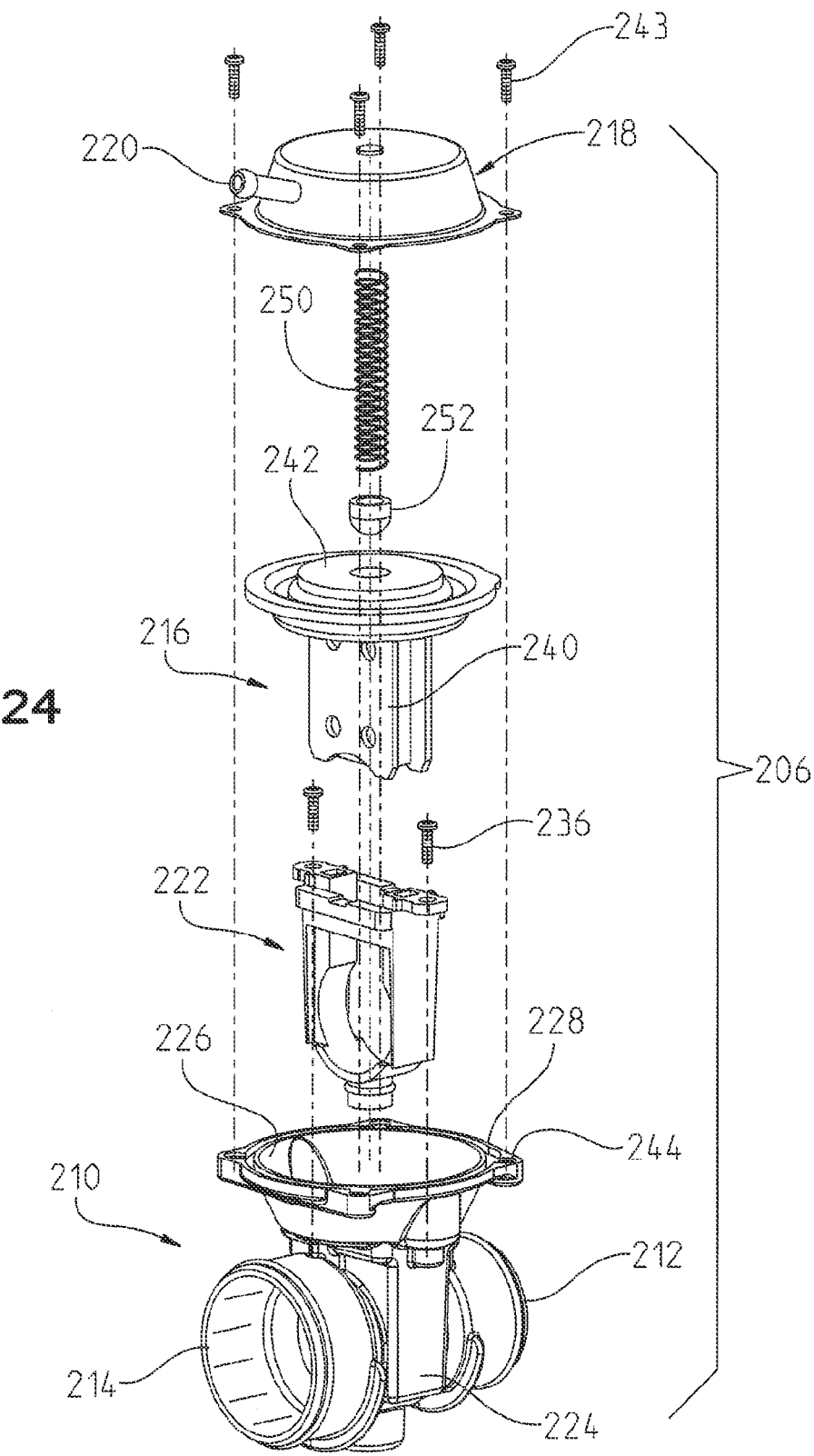
FIG. 24 is an exploded view of the speed control unit.

With reference to FIG. 22, speed control unit 206 generally includes a speed control body shown generally at 210 with an intake side 212 connected to the airbox 202 and an exhaust side 214 connected to the throttle body 208. The speed control unit further includes a guillotine style gate 216 and a top cap 218 having an air input nipple 220. With reference now to FIGS. 23 and 24, the speed control unit is shown in an exploded manner and, in addition, shows an inner housing insert 222.

As shown in FIG. 24, speed control body 210 includes a central body portion 224 which fluidly communicates with an open upper area 226 which is surrounded by a flange 228. Insert 222 is receivable into the central body portion 224 and into the position as shown in FIG. 22. Insert 222 together with housing 210 define an air channel 230 between intake side 212 and exhaust side 214. As best shown in FIG. 22, control body 210 includes a raised section or "tonsil" shown at 230. The raised section 230 is only on one side (the intake side 212) and only extends up to the guillotine gate member 216 as described further herein. Insert 222 is fixedly receivable within central body portion 224 by way of a pair of fasteners 236. As best shown in FIG. 23, insert 222 includes an inner profile 238 having an H-shaped channel as described further herein.

Meanwhile diaphragm assembly 216 includes a guillotine gate valve member 240 attached to a diaphragm 242 where the guillotine valve member 240 has an H-shaped configuration cooperable with opening 238 and is receivable therein and movable upwardly and downwardly transversely of the opening 230. It should also be appreciated that the diaphragm 242 seats on top of opening 226 of the body 210 and that the guillotine valve member 240 is movable upwardly and downwardly within the insert 222 based upon the position of the center of the diaphragm.

The cap 218 is fastened to the top of the body 210 by way of fasteners 243 which are received through apertures of cap 218 and are received in apertures 244 of body 210. This forms a sealed condition around the periphery of opening 226 by way of the diaphragm. A spring 250 and cap 252 are positioned between diaphragm 242 and cap 218 such that the guillotine valve member 240 is normally spring-loaded to a position where the guillotine forms a closed condition within the opening. As also shown in FIG. 23, diaphragm member 216 includes a bleed hole 260 which extends through the guillotine 240 and upwardly through the diaphragm 242 as further described herein. A first pressure chamber is defined under the cap 218 and above the diaphragm, and a second pressure chamber is defined beneath the diaphragm.

Raised section 230 allows for minimal air turbulence entering the throttle. Due to the flat bottom shape of the guillotine valve member 240, the valve member provides a clean conformance with the raised section, to close off the air flow when the guillotine valve member 240 is fully down. There is a certain amount of air leakage that goes through and there is the defined leakage through orifice 260, which preferably is a 1.27 mm hole. This orifice provides the defined leakage as well as a damping effect to the guillotine valve member movement in the up and down direction.

Figure 25A:
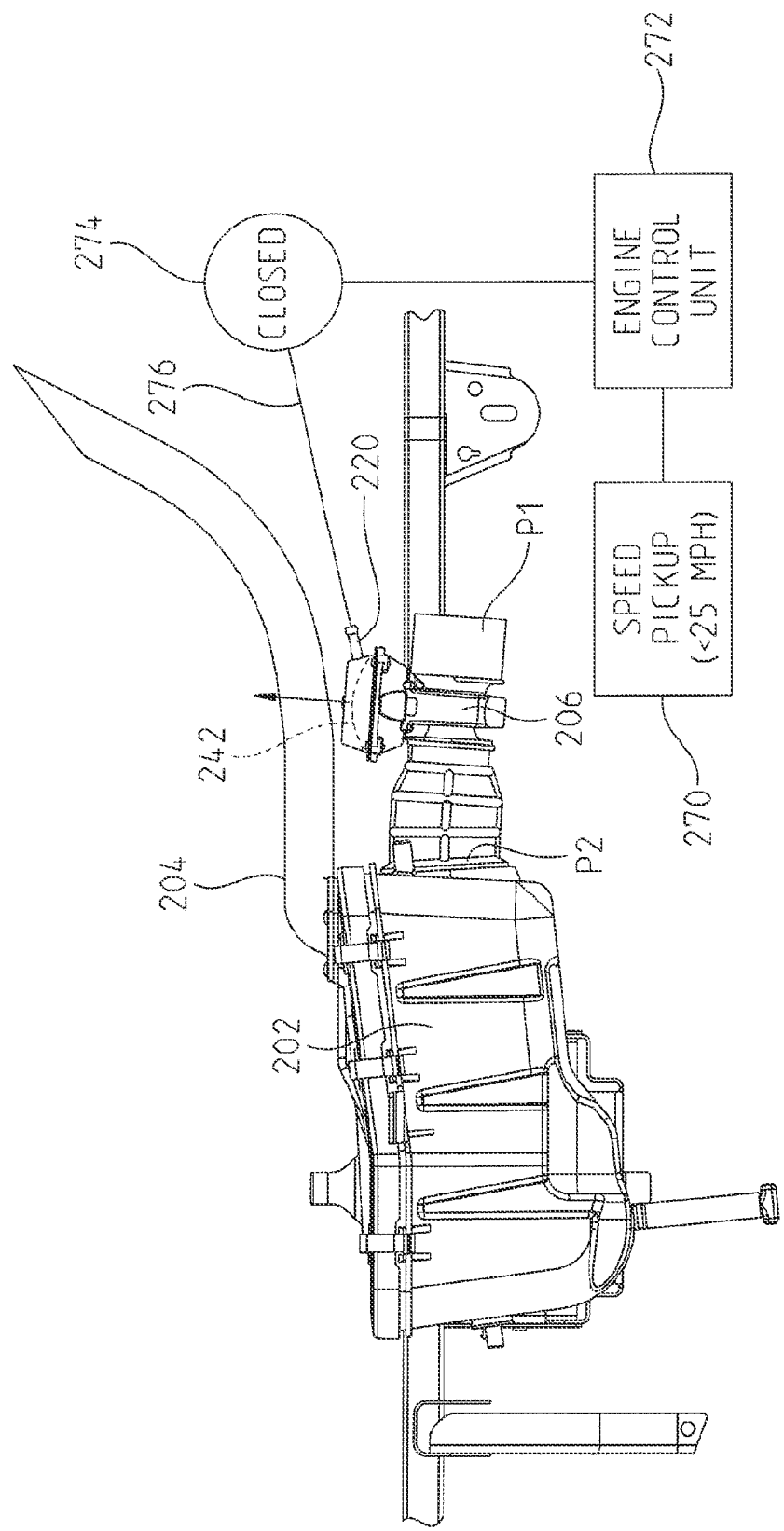
FIG. 25A shows the system operations when the speed is less than 25 mph.
Figure 25B:
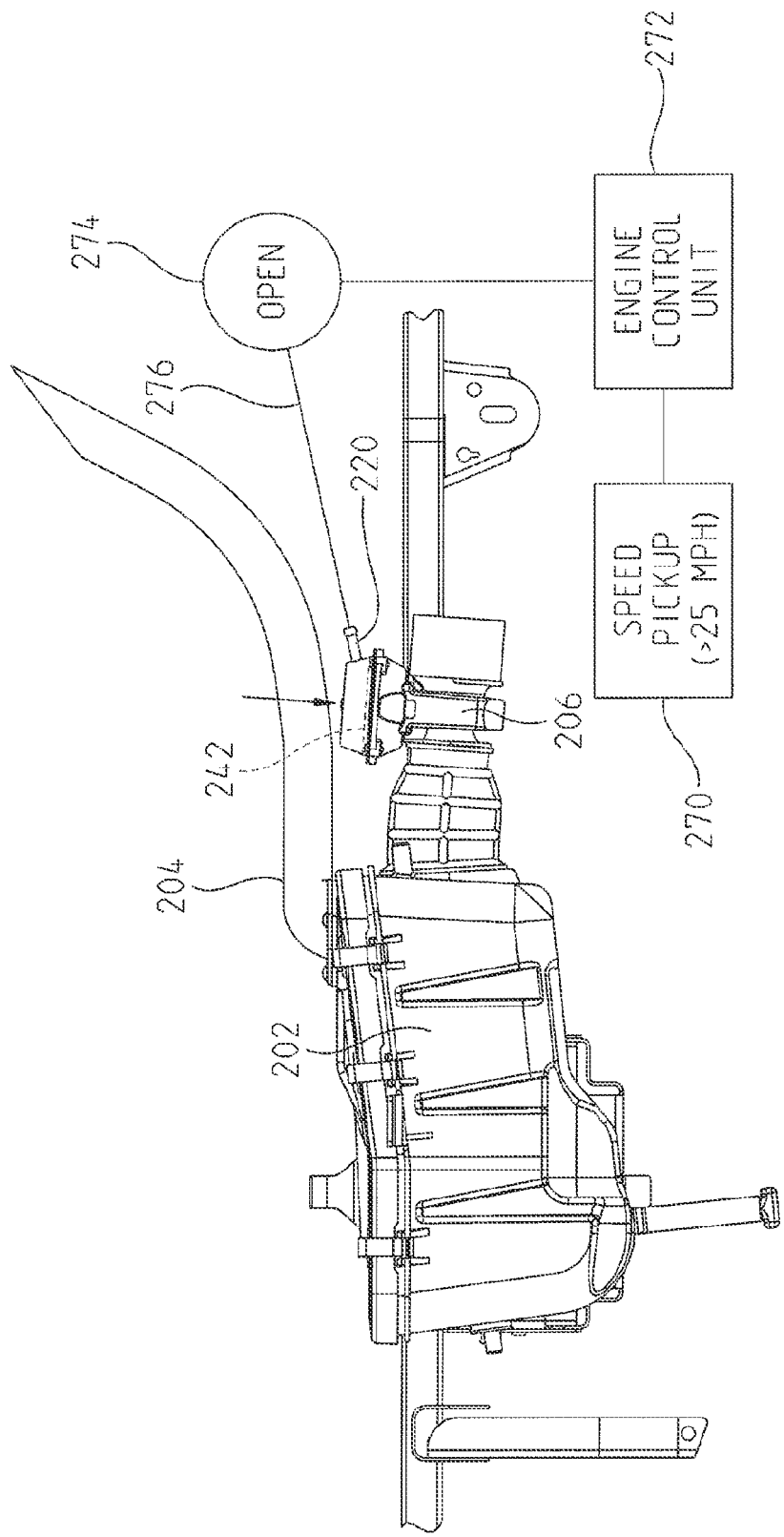
FIG. 25B shows the system operations when the speed is greater than 25 mph.

With reference now to FIGS. 25A and 25B, the operation of speed control device 206 will be described in greater detail. First with respect to controlling the speed, it should be appreciated that any particular speed limit may be set as an upper range but in this particular example, the speed is set to control at a top end speed of 25 mph.

As shown in FIG. 25A, a speed pickup is shown diagrammatically at 270 and this speed pickup could take many different configurations. However, for example, in this embodiment the speed pickup is a Hall Effect sensor located adjacent to the rear wheels which pick up signals from the wheel speed and delivers that information to an engine control unit 272. The engine control unit 272 is also in communication with a solenoid valve 274 which in turn is connected to nipple 220 by a hose 276. Vehicle speed is fed to the engine control unit 272. Solenoid 274 and hose 276 can allow atmospheric pressure into the top of the speed control unit 206, and to the topside of diaphragm 242 when opened.

In the embodiment of FIG. 25A, the tractor is assumed to be operating at a speed of less than 25 mph. This information is fed to engine control unit 272, which closes solenoid valve 274. When the operator tries to increase speed, the engine will create a vacuum pressure P1 on the engine side of speed control unit 206. The pressure on the opposite side of speed control unit 206 P2 (FIG. 25A) is greater, and therefore the greater pressure P2 act on the bottom side of the diaphragm 242 and raises it upwardly. Air on the topside of the diaphragm 242 is allowed to bleed through bleed hole 260 (FIG. 23).

If the tractor comes to a speed of 25 mph or greater, and as shown in FIG. 25B, the speed pick up 270 senses that condition and sends a message to engine control unit 272 that the operational speed is greater than 25 mph. The engine control unit 272 then sends a signal to solenoid valve 274 which allows atmospheric air through hose 276 and allows atmospheric pressure through nipple 220. This places a force on the backside of diaphragm 242 in the direction of the arrow shown in FIG. 25B. This closes the diaphragm and moves the guillotine valve member 240 to its most restrictive position and therefore starves the engine of air.

This condition makes the engine control unit believe that it is at a different operating condition (for example, a higher altitude condition) and therefore, also adjusts such other operating conditions such as fuel input. The net result of the speed control unit 206 is the vehicle speed is reduced to a speed at or below 25 mph. The bleed hole 260 allows smooth acceleration and deceleration without jerky motion.

While this invention has been described as having an exemplary design, the present invention may be further modified within the spirit and scope of this disclosure. The application is, therefore, intended to cover any variations, uses, or adaptations of the invention using its general principles. Further, this application is intended to cover such departures from the present disclosure as come within known or customary practice in the art to which this invention pertains.

What is claimed is:

1. A vehicle, comprising:
   a frame;
   ground engaging elements;
   an engine for motively driving one or more of the ground engaging elements; and
   an air valve positioned intermediate an air intake and the engine wherein the air valve is comprised of:
      a valve body having an upper end, and a lower end having an intake side and an exhaust side, wherein an air channel opening extends between the intake side and the exhaust side;
      a gate valve member positioned within the valve body and operated by a guillotine movable transversely of the air channel opening between up and down positions, the gate valve member providing an opened and closed condition between the intake side and an exhaust side, the gate valve member closing off air flow when the guillotine is in the down position;
      a diaphragm positioned at the valve body upper end and operatively connected to the guillotine, the guillotine being movable based upon the position of a center of the diaphragm, a first pressure chamber being defined above and a second pressure chamber being defined below, the diaphragm; and
      an aperture through the diaphragm connecting the first and second pressure chamber.

2. The vehicle of claim 1, wherein the aperture extends down through the gate valve member.

3. The vehicle of claim 1, further comprising a controller assembly for opening and closing the air valve, the assembly including a speed sensing mechanism and a controlling unit for opening and closing the air valve.

4. A vehicle comprising:
   a frame;
   ground engaging elements;
   an engine for motively driving one or more of the ground engaging elements; and
   an air valve positioned intermediate an air intake and the engine wherein the air valve is comprised of:
      a valve body having an upper end, and a lower end having an intake side and an exhaust side;
      a gate valve member positioned within the valve body and operated by a guillotine, the gate valve member providing an opened and closed condition between the intake side and an exhaust side;
      a diaphragm positioned at the valve body upper end and operatively connected to the guillotine, a first pressure chamber being defined above and a second pressure chamber being defined below, the diaphragm;
      an aperture through the diaphragm connecting the first and second pressure chamber; and
   a controller assembly for opening and closing the air valve, the assembly including a speed sensing mechanism and a controlling unit for opening and closing the air valve;
   wherein the controlling unit, when the vehicle is operating at a speed below an upper speed limit, allows the diaphragm to be raised and maintains the guillotine and the gate valve open.

5. The vehicle of claim 4, wherein the controlling unit, which when the vehicle operates at a speed approaching the upper speed limit, controls the diaphragm to a closed position, which closes the air valve and slows the vehicle.

6. The vehicle of claim 4, wherein the controlling unit is a solenoid valve.

7. The vehicle of claim 6, wherein the solenoid valve is connected to an area above the diaphragm.

8. The vehicle of claim 7, wherein when the vehicle is operating at a speed below an upper speed limit, the solenoid valve is closed.

9. The vehicle of claim 8, wherein when the vehicle is operating at a speed below an upper speed limit, the solenoid valve is open and connects atmospheric pressure to the area above the diaphragm, and closes the guillotine.

10. A vehicle, comprising:
    a frame;
    ground engaging elements;
    an engine for motively driving one or more of the ground engaging elements; and
    an air valve positioned intermediate an air intake and the engine wherein the air valve is comprised of:
       a valve body having an upper end, and a lower end having an intake side and an exhaust side, the intake side comprising a raised and contoured section;
       a gate valve member positioned within the valve body and operated by a guillotine, the gate valve member providing opened and closed positions, wherein in the closed position, the gate valve member is positioned behind the raised and contoured section; and
       a diaphragm positioned at the valve body upper end and operatively connected to the guillotine, a first pressure chamber being defined above and a second pressure chamber being defined below, the diaphragm.

11. The vehicle of claim 10, wherein the raised and contoured section extends upwardly from front to back, and from the side to side towards a center of the valve body.

12. The vehicle of claim 10, wherein an aperture extends through the diaphragm connecting the first and second pressure chamber.

13. The vehicle of claim 12, wherein the aperture ends down through the gate valve member.

14. The vehicle of claim 10, further comprising a controller assembly for opening and closing the air valve, the assembly including a speed sensing mechanism and a controlling unit for opening and closing the air valve.

15. The vehicle of claim 14, wherein the controlling unit, when the vehicle is operating at a speed below an upper speed limit, allows the diaphragm to be raised and maintains the guillotine and the gate valve open.

16. The vehicle of claim 14, wherein the controlling unit, which when the vehicle operates at a speed approaching the upper speed limit, controls the diaphragm to a closed position, which closes the air valve and slows the vehicle.

17. The vehicle of claim 14, wherein the controlling unit is a solenoid valve.

18. The vehicle of claim 17, wherein the solenoid valve is connected to an area above the diaphragm.

19. The vehicle of claim 17, wherein when the vehicle is operating at a speed below an upper speed limit, the solenoid valve is closed.

20. The vehicle of claim 19, wherein when the vehicle is operating at a speed below an upper speed limit, the solenoid valve is open and connects atmospheric pressure to the area above the diaphragm, and closes the guillotine.

\* \* \* \* \*